(12) United States Patent
Paduroiu

(10) Patent No.: US 11,681,471 B2
(45) Date of Patent: Jun. 20, 2023

(54) BYPASSING OF TIER-1 STORAGE IN A STREAMING DATA STORAGE SYSTEM

(71) Applicant: EMC IP Holding Company LLC, Hopkinton, MA (US)

(72) Inventor: Andrei Paduroiu, Bellevue, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 23 days.

(21) Appl. No.: 17/224,726

(22) Filed: Apr. 7, 2021

(65) Prior Publication Data

US 2022/0326878 A1    Oct. 13, 2022

(51) Int. Cl.
*G06F 3/06* (2006.01)

(52) U.S. Cl.
CPC .......... *G06F 3/0659* (2013.01); *G06F 3/0604* (2013.01); *G06F 3/0614* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 8,090,925 | B2* | 1/2012 | Worrall | G11B 27/32 |
| | | | | 711/171 |
| 8,612,680 | B1* | 12/2013 | Madnani | G06F 11/1076 |
| | | | | 711/113 |
| 9,619,180 | B2* | 4/2017 | Malkin | G06F 3/0649 |
| 10,031,703 | B1* | 7/2018 | Natanzon | G06F 3/0647 |
| 10,594,759 | B2 | 3/2020 | Paduroiu | |
| 10,666,703 | B2 | 5/2020 | Paduroiu et al. | |
| 10,944,807 | B2 | 3/2021 | Paduroiu | |
| 10,963,189 | B1* | 3/2021 | Neelakantam | G06F 3/0616 |
| 10,976,948 | B1* | 4/2021 | Lee | G06F 3/0644 |
| 2005/0144361 | A1* | 6/2005 | Gonzalez | G06F 12/0607 |
| | | | | 711/E12.079 |
| 2007/0016725 | A1* | 1/2007 | Chu | G06F 3/0679 |
| | | | | 711/113 |
| 2012/0110258 | A1* | 5/2012 | Lakey | G06F 12/0888 |
| | | | | 711/E12.019 |
| 2014/0281152 | A1* | 9/2014 | Karamcheti | G06F 3/0655 |
| | | | | 711/103 |
| 2015/0169449 | A1* | 6/2015 | Barrell | G06F 12/0868 |
| | | | | 711/143 |

(Continued)

*Primary Examiner* — Yaima Rigol
(74) *Attorney, Agent, or Firm* — Amin, Turocy & Watson, LLP

(57) ABSTRACT

The described technology is generally directed towards a streaming data storage system that can switch between a tiered mode of operation in which events are written to Tier-1 storage and later migrated to Tier-2 storage, and a direct mode of operation in which events are written to Tier-2 storage, bypassing the tiered mode. The switching from tiered mode to direct mode, and from direct mode to tiered mode, can be automatic and based on user configuration information. For example, an event size metric (e.g., average event size) can be evaluated against user defined thresholds to determine which mode to use. If the average event size goes below a low threshold value, the tiered mode is switched to and used for appending events to a segment of a data stream. If the average event size goes above a high threshold value, the direct mode is switched to and used.

20 Claims, 15 Drawing Sheets

(56) References Cited

U.S. PATENT DOCUMENTS

| | | | |
|---|---|---|---|
| 2015/0286438 A1* | 10/2015 | Simionescu | G06F 12/0866 711/103 |
| 2016/0231941 A1* | 8/2016 | Oh | G06F 3/0647 |
| 2017/0060754 A1* | 3/2017 | Nakra | G06F 12/0871 |
| 2019/0129863 A1* | 5/2019 | Jibbe | G06F 12/0871 |
| 2022/0206702 A1* | 6/2022 | Gao | G06F 3/0688 |

* cited by examiner

BYPASSING OF TIER-1 STORAGE IN A STREAMING DATA STORAGE SYSTEM

BACKGROUND

Some contemporary data storage systems store data in a storage abstraction referred to as a data stream, or more simply, a stream. A stream is identified with a name, and can store continuous and potentially unbounded data; more particularly, a stream comprises a durable, elastic, append-only, sequence of stored events. New events received from writer applications are added to a tail (front) of a stream. One stream may be divided into one or more segments, with an event appended to a segment based on a routing key associated with the event that determines to which segment the event data is written.

The new events produced by writer applications are first stored to Tier-1 storage (sometimes written unhyphenated, that is, "Tier 1" storage), which is a fast stream append storage layer. These events are later moved to Tier-2 (sometimes unhyphenated "Tier 2") storage for long term retention, that is, Tier-1 storage is used for durable buffering of incoming event appends before distributing these events to Tier-2 storage, which is the long-term storage for stream data, typically comprising an object storage system or a file storage system. Tier-1 storage is normally configured with solid state drives (SSD) or Non-volatile Memory Express (NVMe)-based storage devices and is thus relatively expensive and typically small compared to Tier-2 storage. Tier-2 storage is generally configured with hard disk drives and is therefore capacious (and potentially unbounded), but is a relatively slow storage layer compared to Tier-1 storage.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
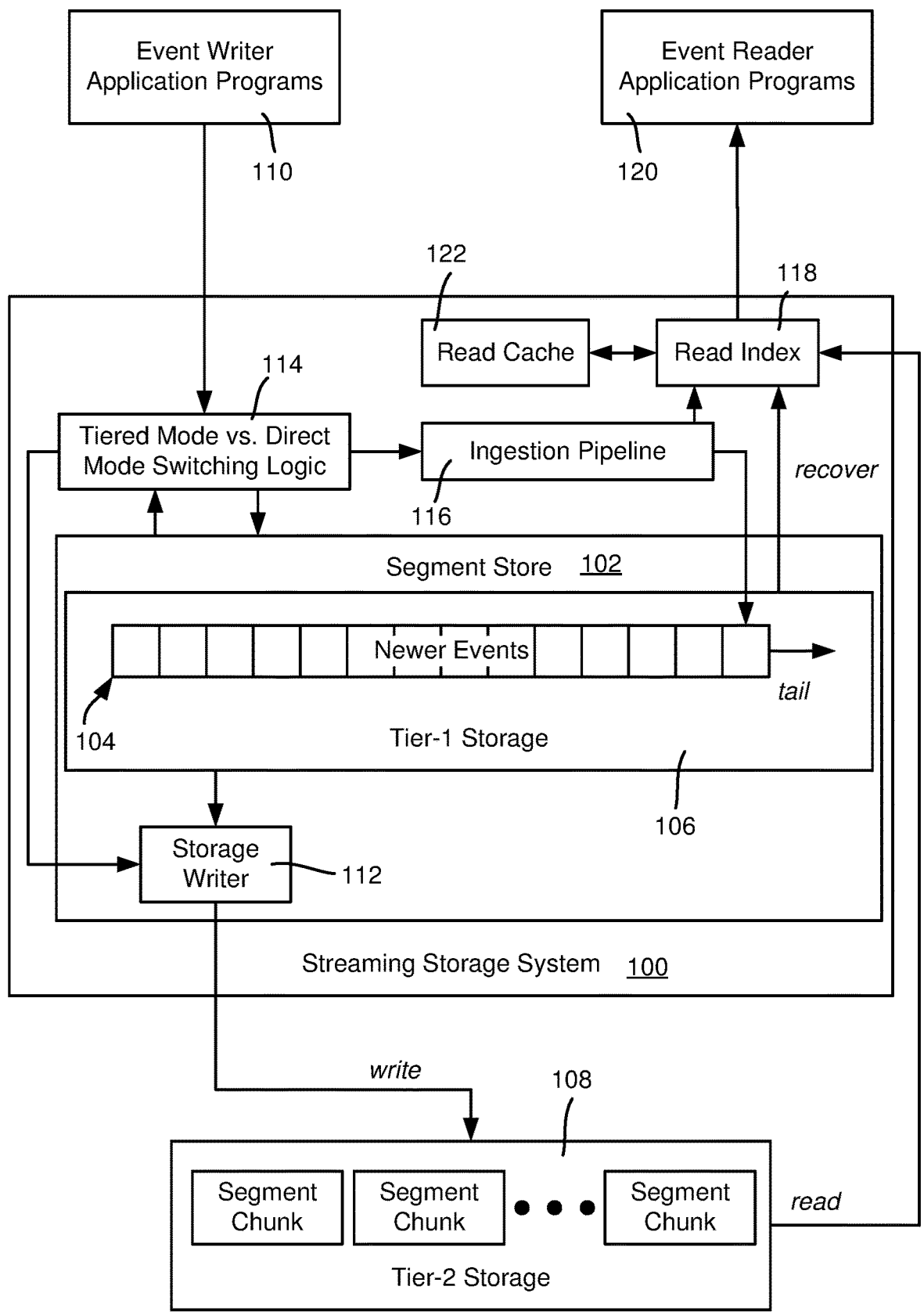
FIG. 1 is a block diagram representation of example components and data-related operations in a streaming data storage system in which a segment can be in a tiered mode of operation in which events are written to Tier-1 storage and later migrated to Tier-2 storage, or a direct mode of operation in which events are written to Tier-2 storage, bypassing the tiered mode, in accordance with various aspects and implementations of the subject disclosure

Various aspects of the technology described herein are generally directed towards event ingestion in a data streaming storage system that changes between writing events to a first tier storage (tiered mode) or writing events directly to a second tier storage (direct mode, bypassing writes to the first tier storage). The technology can automatically switch modes when the data streaming storage system deems that switching modes is advantageous. For example, via the technology described herein, the data streaming storage system can switch over to writing directly to the second tier (e.g., Tier-2) storage when the event ingestion patterns indicate that doing so will improve system performance. Similarly, the data streaming storage system can switch back to tiered mode, which writes to the first tier (e.g., Tier-1) storage, and later writes the data to second tier storage.

More particularly, new events received at the data streaming storage system are generally written first to the first tier storage, and later moved to the second tier storage (which may be aggregated with other events on the same segment). This two-tiered scheme performs well with a large number of events with small size data (e.g., less than 1 KB); in this scenario, such events are appended to a Tier-1 log with relatively little system effort, providing high latency and throughput (which is one purpose of streaming data storage systems). Such events can be aggregated into larger batches (e.g., on the order of megabytes) to be written to Tier-2 storage, as Tier-2 storage handles large writes with high throughput, but usually has a latency that can be too high for many event streaming purposes. Notwithstanding, the sizes of some events are not always small, and indeed certain events can be measured in megabytes or even dozens of megabytes; (as a more particular example, in the case of a video stream where one frame is written at a time, an uncompressed 1080p frame with thirty-two bits per pixel is around eight megabytes). In such situations, Tier-1 storage may not provide better performance or provide advantages when compared to Tier-2 storage, as the performance is driven mostly by the physical characteristics of the storage devices themselves and network capacity, and Tier-1 storage has a higher cost per megabyte compared to Tier-2 storage. Thus, the advantages of the two-tiered scheme erode as the event size increases. As such, the technology described herein operates to write certain event data directly to Tier-2 storage instead of writing the event data once to Tier-1 and asynchronously copying that data to Tier-2 at some point in the future, as writing directly to Tier-2 storage can be faster and more efficient in terms of resource usage for certain events.

In one implementation, the data streaming storage system described herein determines when it is appropriate to change to the direct mode and write directly to Tier-2 storage, bypassing Tier-1 storage writes. Similarly, the data streaming storage system determines when it is appropriate to change to the tiered mode and write to Tier-1 storage, later moving the data to Tier-2 storage for long term retention.

It should be understood that any of the examples herein are non-limiting. For instance, chunks are referred to herein as a Tier-2 storage container for event data, however virtually any stream-based data storage system with similar or other types of storage containers may benefit from the technology described herein. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

The subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows a streaming data storage system 100 that includes a segment store 102 that maintains and manages one or more segments of event data of a data stream. In the example of FIG. 1, the segment store 102 comprises a segment 104 of event data of a data stream, with new events appended to the tail, such that the segment 102 grows from a head towards a tail direction. In general, segments act as logical containers for the data of events within the stream. A data stream's segment such as the segment 104 is typically maintained with its newer events in Tier-1 storage 106 to facilitate better relative processing performance, and its older events in Tier-2 storage 108.

In general, event writers such as one or more streaming application programs 110 send data writes (events) to the streaming data storage system 100 (e.g., via an application programming interface (API) to the system 100) for appending to a data stream segment. The segment (e.g., the segment 104 in FIG. 1) is selected based on a routing key accompanying the event data. Note that from the perspective of event writers, the system seems unchanged, except that performance improvements may be noted.

However, as set forth herein, for some (e.g., large) events, it is not necessarily more performant to first ingest events to Tier-1 storage, and later move (via a storage writer 112 of the segment store 102) the event data to Tier-2 storage 108. In general, the storage writer 112 aggregates written data (from a Tier-1 cache) to Tier-2 storage; (later, events may be copied from Tier-2 storage back to the cache to serve catch-up and historical data reads).

Described herein is tiered mode versus direct mode switching logic 114 that operates to determine whether to use a classical ingestion pipeline 116 to append events to Tier-1 storage, or to bypass the Tier-1 storage and write events (more) directly to Tier-2 storage. The mode switch can be automatic based on user-provided threshold values, for example. Note that although not explicitly shown in FIG. 1, at least part of the tiered mode versus direct mode switching logic 114 can be implemented in logic of the segment store 102.

For tiered mode events, the events are run through the ingestion pipeline 116, which performs validation (e.g., the segment exists, the segment is not sealed, and so forth), along with any needed aggregation before writing to Tier-1 storage and then to a read index 118. The read index 118 facilitates data reads to event reader application program(s) 120. The read index 118 can include a backing read cache 122 that is a relatively fast (normally RAM-based) storage layer with no expectation of durability. New events go to the read cache 122 directly to serve tail reads, (comprising reads to registered readers of the segment that want to rapidly know of each newly appended event). The read index 118 also maintains metadata that stitches together multiple pieces of the segment in order to provide a unified view of the segment to readers 120.

In general, the role of Tier-1 storage is relatively modest in typical implementations. The use of Tier-1 storage is provided to assure fast write acknowledgements, and under typical circumstances, no data is read from Tier-1; however Tier-1 storage can be used as a source of data in recovery scenarios.

Figure 2A:
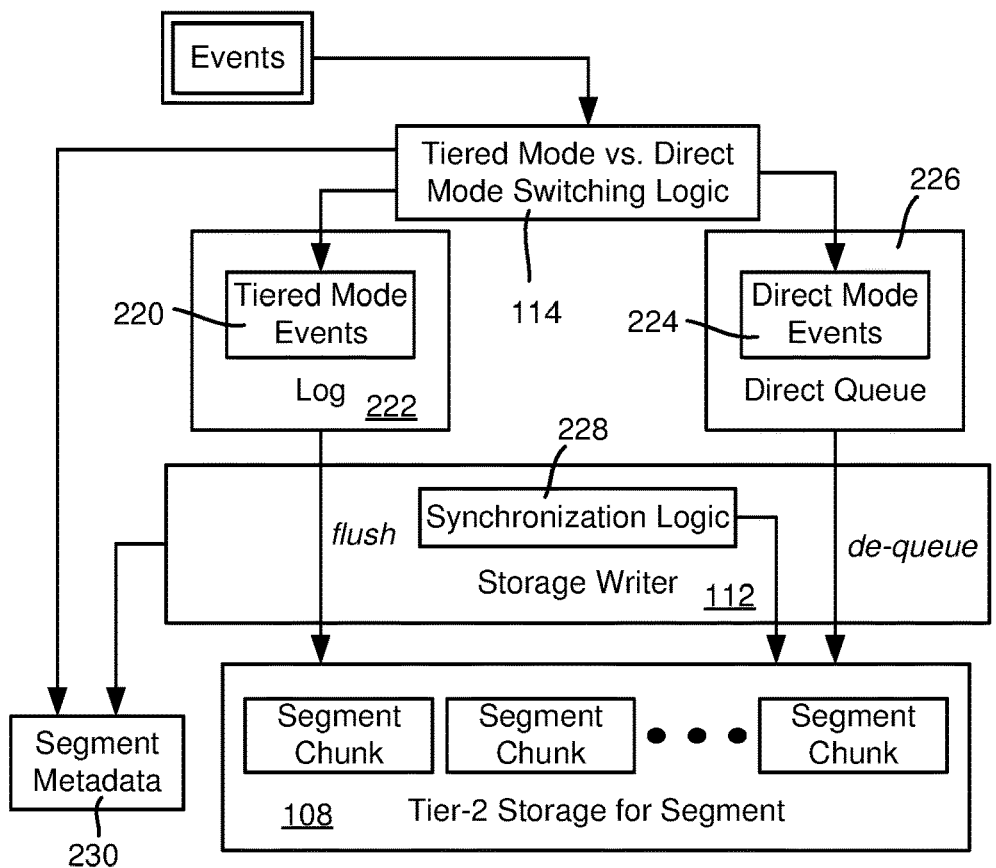
FIG. 2A is a block diagram representation of example components and data-related operations for direct mode and tiered mode event handling with a flush option, in accordance with various aspects and implementations of the subject disclosure.

FIG. 2A shows example components that can be used with a tiered mode or direct mode with respect to a "flush" option as described herein. In general, when an event is received while the segment is in the tiered mode, tiered mode events 220 are logged in fast storage 222 and later migrated to Tier-2 storage 108 by the storage writer 112 of the segment store. When an event is received while the segment is in the direct mode, direct mode events 224 are queued (block 226) and later de-queued to Tier-2 storage 108. This is because when operating under the flush option, the storage writer 112 needs to flush any tiered mode events 220 to the Tier-2 storage 108 before de-queueing later-received direct mode events 224, so as to keep the events in the correct order. The storage writer 112 thus can include synchronization logic 228 to ensure the proper ordering of events in Tier-2 storage, as well as update segment metadata 230, as described below with reference to FIGS. 4-7.

Figure 2B:
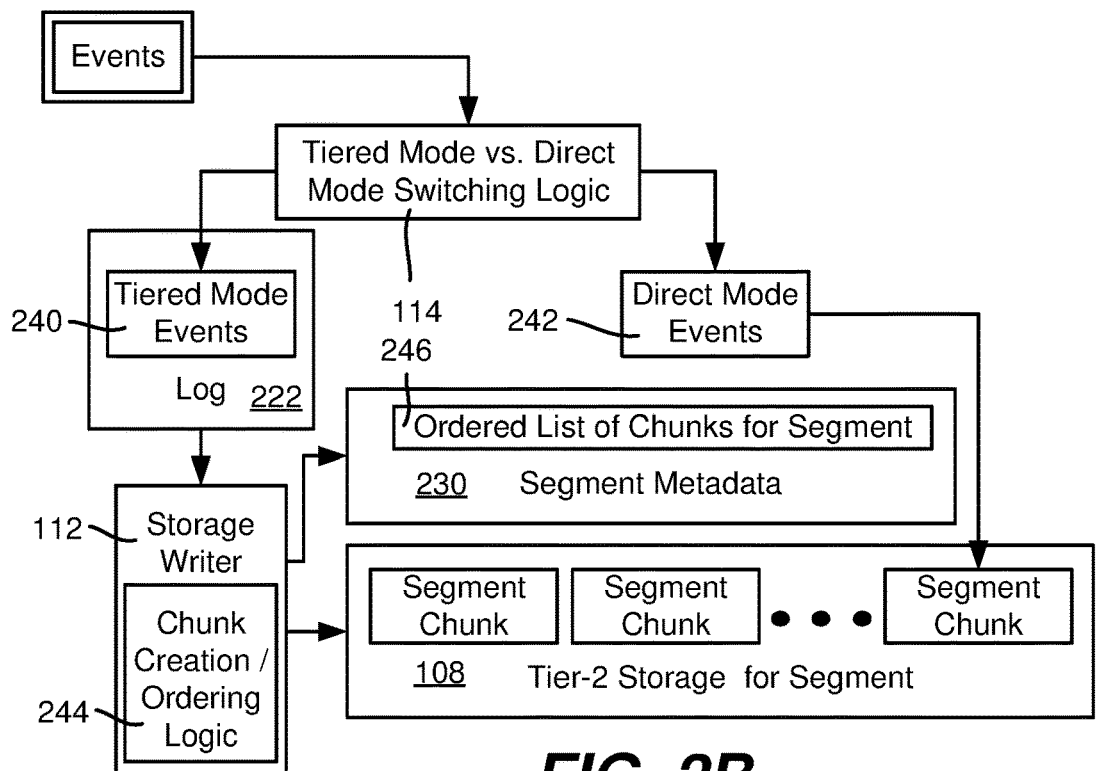
FIG. 2B is a block diagram representation of example components and data-related operations for direct mode and tiered mode event handling with an "async switching" option, in accordance with various aspects and implementations of the subject disclosure.

FIG. 2B shows example components that can be used with the tiered mode or the direct mode with respect to an "async switching" option as described herein. In async switching, tiered mode events 240 (when migrated to Tier-2 storage 108) are asynchronously written by the storage writer 112 from Tier-1 storage to one or more segment chunks in Tier-2 storage 108, whereas direct mode events 242 are written to their own separate Tier-2 chunk(s). The storage writer 112 (or other segment store component) includes chunk creation and ordering logic 244 that ensures that earlier events are written to chunks that are before (in chunk ordering) the chunks containing events received later. The segment metadata 230 is updated, including with an ordered list of chunks 246 for the segment. The operations using the async switching option are described with reference to FIGS. 8-10.

The technology operates to determine when (and when not) to bypass Tier-1 storage. The technology is automated, based on configuration settings (e.g., threshold values) that can be set by user input (or by default). Note that having a user instruct the streaming data storage system whether upcoming traffic is "large" or "small" is feasible for determining tiered mode versus direct mode event handling, such as specified at the stream level or as an API call. However, users are generally not able to predict future events, and for example, even with video frames, not all frames are necessarily the same size, such as when using compression that results in some frames being much smaller than other frames.

As described herein, an event size metric is used to automatically switch modes. Note that a user can configure the system to not use automatic mode switching, e.g., by opting in or not, or by setting the event size metric to ensure that only the tiered mode will be used, or only the direct mode will be used.

Notwithstanding the event size metric described herein, deciding at the event level is generally not practical, that is, for example, to write events larger than a threshold size to Tier-2, and those at or below the threshold size to Tier-1 storage. Because of the need to maintain consistent event ordering, the system would need to carefully track event storage locations, e.g., in what can be a random or mostly random pattern, the system may send one event to Tier-2, then the next event to Tier-1 storage, then the next to Tier-2 storage and so on. Keeping track of the event ordering between tiers makes such a solution generally infeasible.

In one implementation, the event size metric is the average size of events. Note that this can be a running average over all events, over some number of events (e.g., the most recent ten percent, most recent N event appends, event appends within the last T seconds), and so on. Note that instead of an average, another statistical computation can be used.

Thus, in one implementation ingestion traffic patterns are used to determine the event size metric, which is evaluated against threshold values. For example, the user can configure two settings, namely a high threshold value (HighThreshold) and low threshold value (LowThreshold, where the low threshold value needs to be less than or equal to the high threshold value). These are measured in bytes (or equivalent) and can be configured system-wide or on a per stream basis.

The segment store 102 (FIG. 1), which handles segment-related operations, records statistics regarding the events appended to each segment that the segment store maintains. For each such segment, the segment store may keep, for example, the moving average (for the last N event appends or the event appends within last T seconds) of event sizes. This statistic (e.g., Segment.AvgEventSize) can be updated every time a new event is appended to a segment.

Then, if Segment.AvgEventSize>HighThreshold, the segment to is configured to enter the direct mode of operation (if not already in the direct mode), bypassing the Tier-1 storage. Conversely, if Segment.AvgEventSize<=LowThreshold, the segment is configured to enter the tiered mode (if not already in the tiered mode). The point of defining two thresholds is to avoid switching back and forth between modes in rapid succession if traffic patterns are inconsistent. Alternatively, a user can indirectly define the high and low threshold values by configuring a general threshold value and a sensitivity value; (e.g., as a percentage, such as LowThreshold:=Threshold*(100%−Sensitivity) and HighThreshold=Threshold*(100%+Sensitivity).

Figure 3:
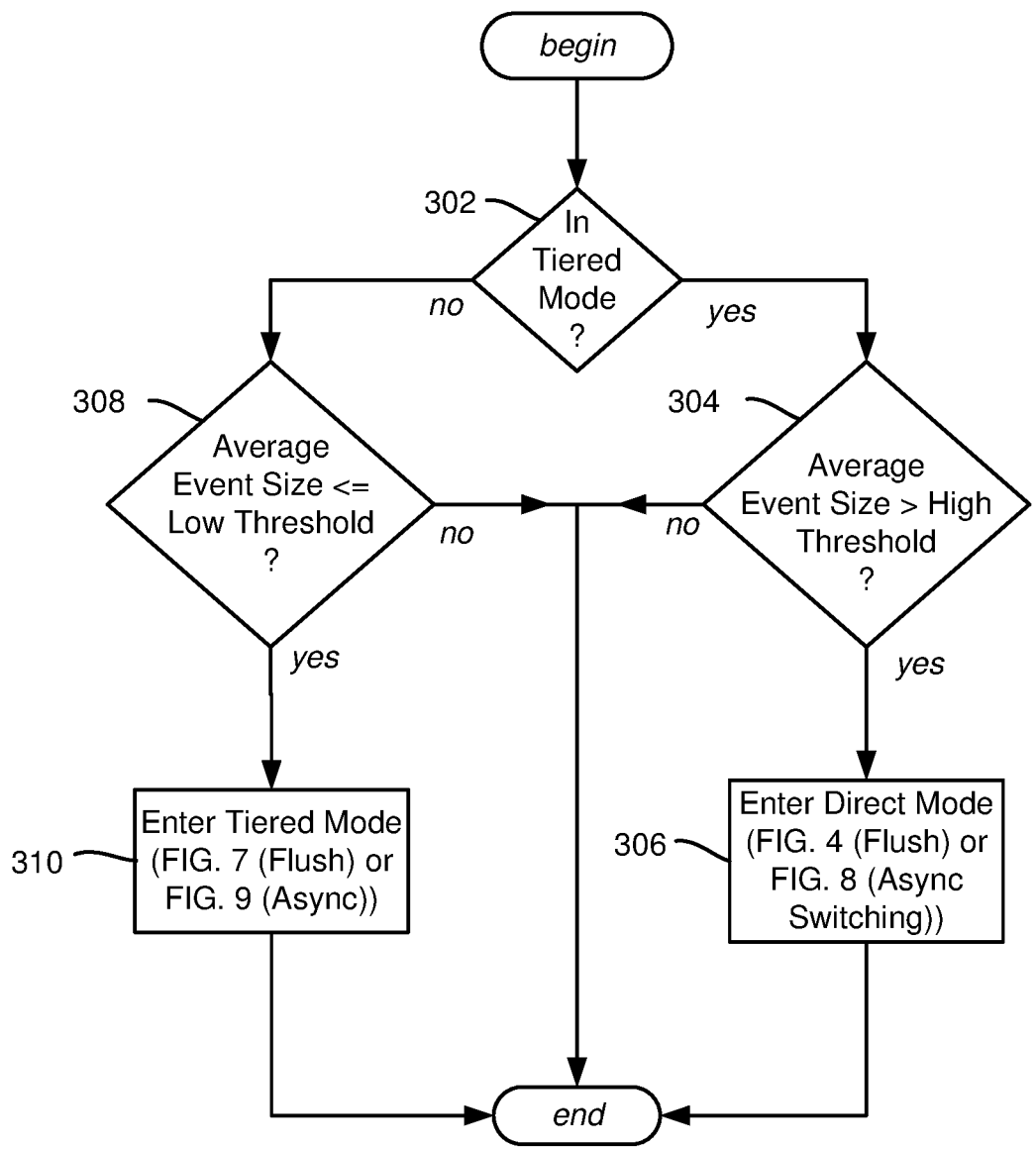
FIG. 3 is a flow diagram showing example operations for determining when to change from the direct mode to the tiered mode or vice-versa, in accordance with various aspects and implementations of the subject disclosure.

FIG. 3 shows the tiered mode versus direct mode switching logic, beginning at operation 302 where a mode switch decision is evaluated. If in the tiered mode at operation 302, then operation 304 evaluates where the average event size for this segment is greater than the high threshold value. If so, operation 306 switches to enter the direct mode, as described below with reference to FIGS. 4-6 and FIG. 8. If not in the tiered mode at operation 302, that is, the system is currently in the direct mode for this segment, then operation 308 evaluates where the average event size is less than or equal to the low threshold value. If so, operation 310 enters the tiered mode for this segment, as described below with reference to FIG. 7 and FIG. 9.

Figure 4:
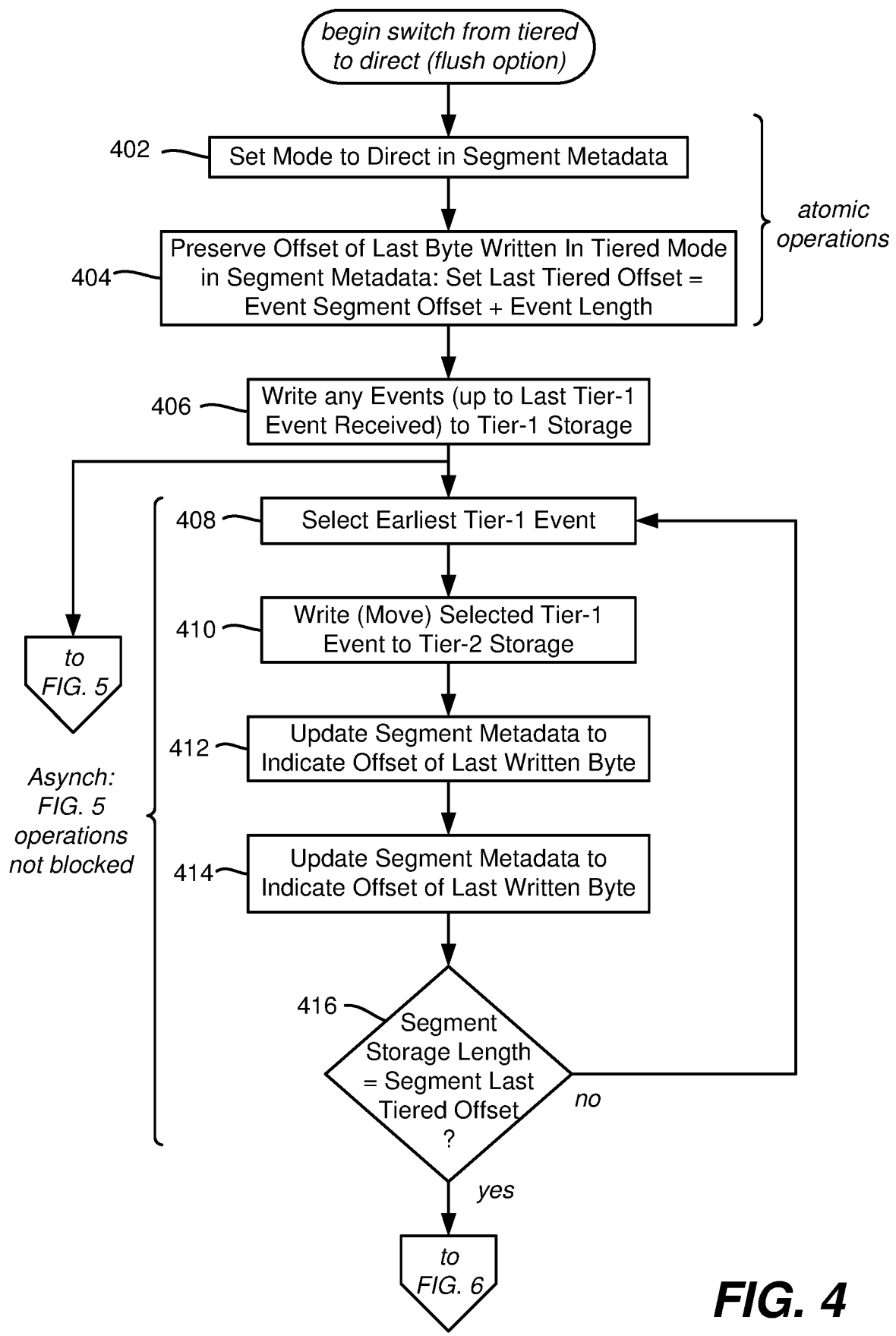
FIGS. 4-6 comprise a flow diagram showing example operations for changing from the tiered mode to the direct mode when the flush option is in use, in accordance with various aspects and implementations of the subject disclosure.
Figure 5:
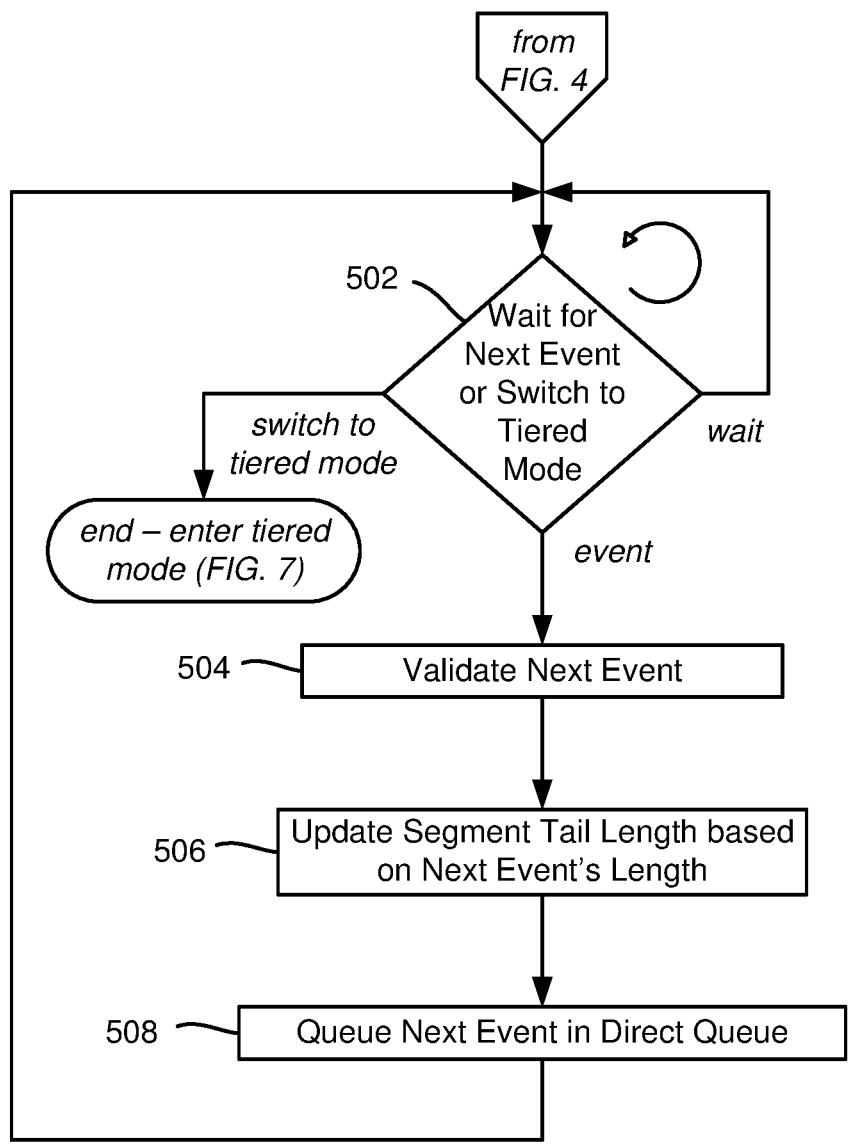
Figure 6:
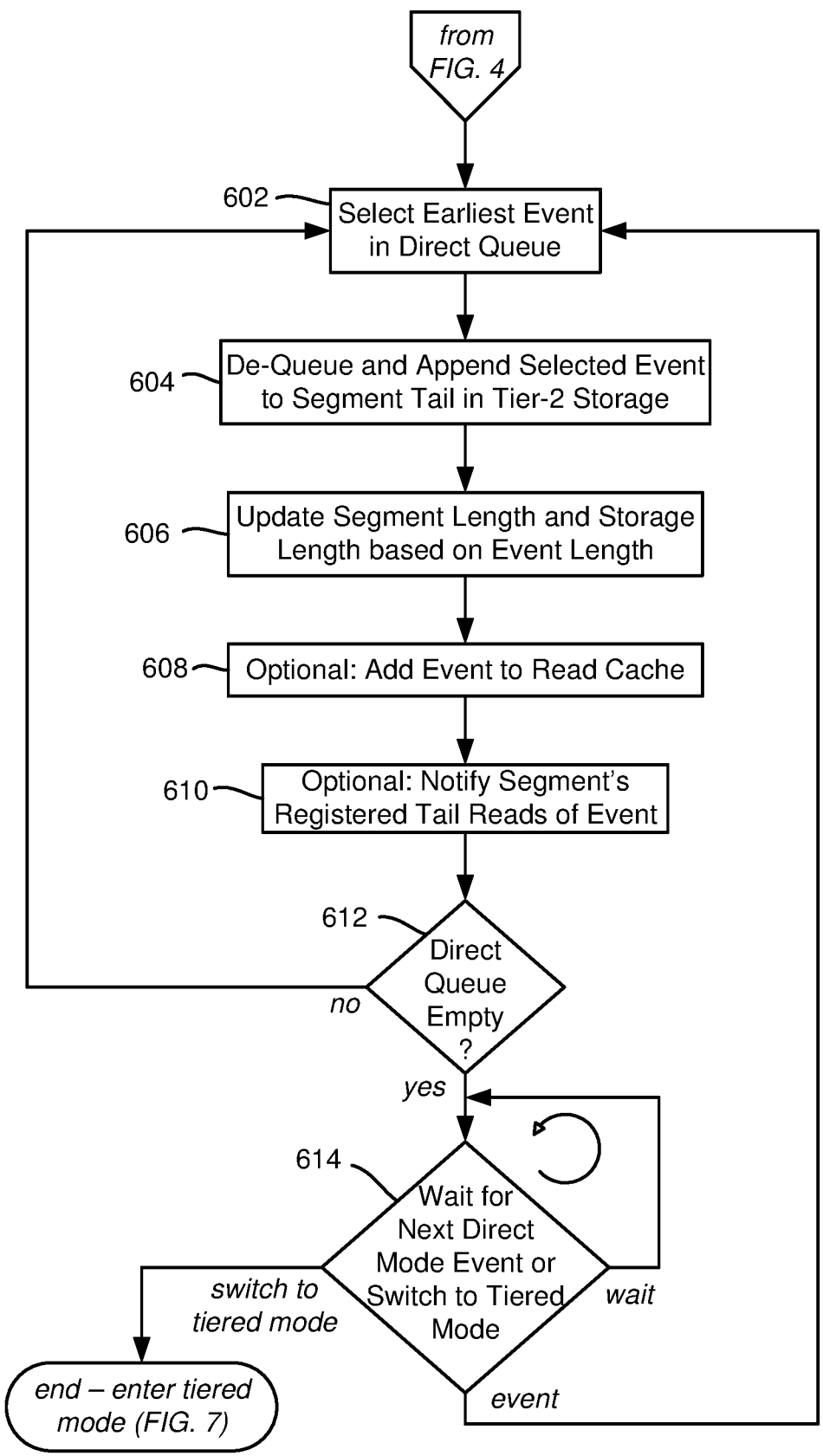

FIGS. 4-6 are example operations in one implementation for changing from the tiered mode to the direct mode of appending events. The operations of FIGS. 4-6 ensure that when reading the segment events back, the events are in the correct order and there are none unintentionally placed later events in front of earlier received events. To this end, consider events E1, . . . , Em written in tiered mode to Tier-1 storage, when a change to the direct mode is determined (e.g., via the operations of FIG. 3). At this point, the segment is switched to direct mode, such that event Em+1 is to be written to Tier-2 storage. However, because of the switch to direct mode after Em, there is no guarantee that E1, . . . , Em have actually been written to Tier-2 storage yet. If Em+1 is written Tier 2, and then any of E1, . . . , Em are written afterwards (which is done asynchronously), then there will be out of order events. Note that switching from direct mode to tiered mode, described below with reference to FIG. 7) does not have this potential problem.

Note that there are multiple ways to change to the direct mode while maintaining correct event ordering as described herein, and the example operations of FIGS. 4-6 exemplify a first way (the flush option); (FIG. 8, described below, exemplifies a second way, the async switching option). The example operations of FIGS. 4-6 are useful in a general case when the system cannot make any assumptions about the layout of the segment data in Tier-2 storage, although the flush option has a performance drawback, in that switching from one mode to another may cause the ingestion traffic to temporarily halt in order to finish performing Tier-2 writes.

A first way to ensure correct ordering when changing from the tiered mode to the direct mode is based on flushing the Tier-1 segment events to Tier-2 storage. This will (optionally trigger and) await the segment that switches from tiered mode to direct mode to be fully flushed to Tier-2 storage before accepting new writes that are written directly to Tier-2 storage.

By way of example, consider that a segment S is currently in tiered mode and is to be switched to direct mode, in which the last event written to S in tiered mode is Em (i.e., the switch was triggered after writing this Em event). When this occurs, at operations 402 and 404 of FIG. 4 the segment store atomically sets metadata properties on the segment S, namely S.Mode:=Direct and S.LastTieredOffset=Em. SegmentOffset+Em. Length, respectively. In other words, the segment store preserves the offset of the last byte that was written in the tiered mode.

At operation 406, the segment store proceeds with writing the events up to Em to Tier-1 storage, and then (via operations asynchronously writing them to Tier-2; (asynchronously means that the writes to Tier-2 storage do not block the operations of FIG. 5, which handle events received in the direct mode, from executing).

The asynchronous writes of Tier-1 events to Tier-2 storage begin at operations 408 and 410, along with operations 412 and 414 which update the segment S's metadata to indicate the offset of the last written byte. Operation 416 repeats writing from the earliest remaining event until the last event is moved to tier-2 storage By way of example, consider that after writing events up to some arbitrary event Ej, the metadata is S.StorageLength:=Ej.SegmentOffset+Ej.Length. As a result, after writing the last tiered mode tier-1 event Em to Tier-2 storage, the metadata is S.StorageLength==Em.SegmentOffset+Em. Length==S.Last-TieredOffset.

FIG. 5 shows example operations when the segment store has switched to the direct mode, beginning at operation 502 which waits for a next event (or a switch back to the tiered mode). When at operation 502 the segment store receives a subsequent event En (n>m) for the segment S (which is now in direct mode), operation 504 validates Em (for example to make sure the segment is not sealed, that any other conditions are met and so forth). In this example the event is validated, and thus operation 504 updates the segment's length in the segment store metadata for this segment, e.g., S.TailLength:=S.TailLength+En.Length. This is a "non-committed" length of the segment, which is used to estimate the size of S (note that this value includes the non-persisted tail portion), and is also used for validation of future events (when operation 504 again is executed).

Operation 508 places the event En in a direct queue (S.DirectQueue). This direct queue is used to establish order between events (i.e., Tier-2 storage may not support concurrent writes or may not guarantee the order of writes).

Returning to FIG. 4, operation 416 repeats the asynchronous writes of Tier-1 events until they are fully written, that is, awaits for S.StorageLength==S.LastTieredOffset. In other words, the system waits for every event that has been written in tiered mode to be written to Tier-2 (so order is preserved) before proceeding to drain the direct queue as in the example of FIG. 6. Note that if this condition is never reached, then an error occurred while processing the events up to Em (e.g., the segment has been sealed or asynchronously deleted). If this happens, any errors from this processing need to be propagated at this point and prevent the processing of events received in direct mode to avoid writing events out of order or corrupting data. For purposes of this example, consider that no such error occurs, and eventually the last tiered mode event Em is successfully migrated to Tier-2 storage, whereby operation 416 branches to operation 602 of FIG. 6 to begin draining the direct queue.

In general, the operations of FIG. 6 are performed as long as the direct queue S.DirectQueue is not empty. Operation 602 selects the earliest event, initially En from the direct queue, and appends that event to the end of the segment S in Tier-2 storage. Operation 604 updates the segment length and storage length in the internal metadata, that is, S.Length:=S.StorageLength:=S.Length+En.Length. Note that the segment and storage length values, S.Length and S.StorageLength respectively, are changed at the same time while in direct mode, as the event data is written directly to Tier-2 storage.

Operations 608 and 610 are optional. Operation 608 can be executed to add the event En to the read cache 122 (FIG. 1) so that readers can quickly read the event. Operation 608 can be executed to notify any registered tail reads on the segment S that the event En has been appended. As set forth herein, a reader can register a tail read for a segment such that each new event notifies the registered reader of the event having been written to the segment.

Operation 612 repeats the process until the direct queue is empty. Operation 614 waits for a next direct mode event to be queued (via the operations of FIG. 5), or for the segment to be changed back to the tiered mode of operation.

At some point, the segment S which is currently in direct mode may be switched to the tiered mode, at which the direct mode operations end, and the tiered mode operations start (or restart). The direct mode operations (corresponding to the tier-1 flush procedure of FIG. 4-6) are shown in FIG. 7.

Figure 7:
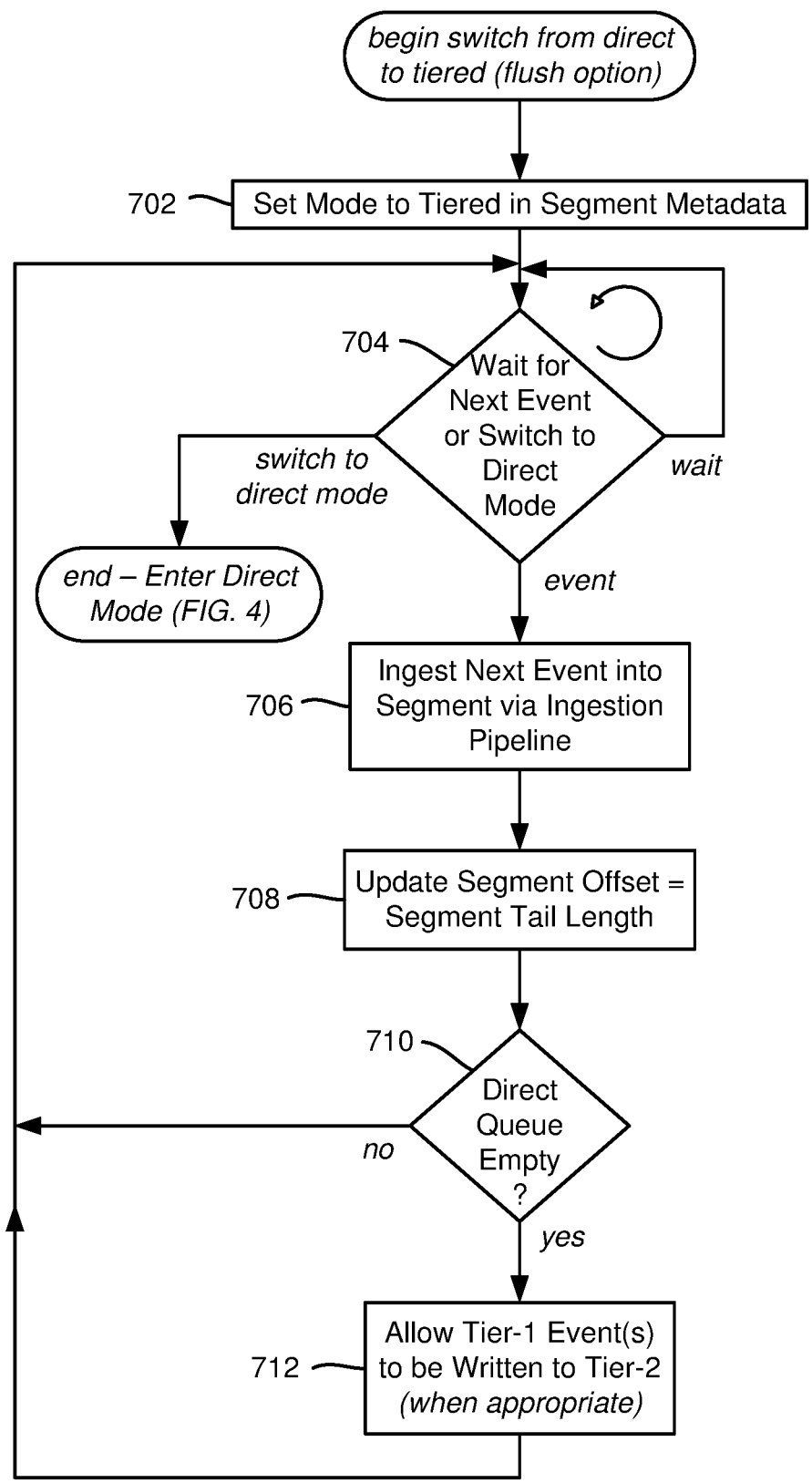
FIG. 7 is a flow diagram showing example operations for changing from the tiered mode to the direct mode when the flush option is in use, in accordance with various aspects and implementations of the subject disclosure.

Operation 702 of FIG. 7 sets the mode to the tiered mode in the segment metadata, e.g., S.Mode:=Tiered. Operation 704 waits for a next (now tier-1) event to be received, or for a switch to the direct mode. Consider that the last event written to the segment S in direct mode was Ey (the switch was triggered after writing event Ey).

At this point, no more events will be added to the direct queue S.DirectQueue. Note however that operations 602-612 can still be draining the direct queue to Tier-2 storage (asynchronously, such that the operations of FIG. 7 are not blocked).

When the segment store receives a subsequent event Ex (x>y) for the segment S, (which is now in tiered mode), the event Ex is run through the classic ingestion pipeline. When this occurs, operation 708 accounts for the segment's tail length S.TailLength, because new events can be processed in tiered mode while asynchronously draining the events from the segment's direct queue S.DirectQueue; (there is no need to serialize these two tasks). As a result, the metadata is updated (Ex.SegmentOffset:=S.TailLength) to ensure event ordering and continuity.

Eventually, the storage writer will begin moving the tiered mode event Ex (and subsequent events that arrived after the event Ex) to Tier-2 storage. However, the storage writer needs to wait (operation 710) for the direct queue to be empty before proceeding at operation 712, which allows subsequent Tier-1 events to be moved to Tier-2 storage. For example, the storage writer can wait for the following condition to be true: S.DirectQueue.Count==0, or can alternatively wait for the equivalent condition to be true, S.StorageLength==Em.SegmentOffset. In other words, the storage writer waits for the events written in direct mode to have been written to the segment S in Tier-2 storage before attempting to write tiered mode event Ex (and subsequent tiered mode events) to Tier-2 storage.

While the flush-related option of FIGS. 4-7 is acceptable in some scenarios, one implementation of a streaming data storage system supports sub-segmenting Tier-2 segment data (that is, chunking). An alternative technique, referred to as "async switching" is described herein that takes advantage of chunking without any noticeable effects to the upstream writer/reader applications. More particularly, async switching addresses the shortcomings of waiting for Tier-1 events to be flushed (FIG. 4) by making use of chunking (splitting the segment into smaller chunks) in Tier-2 storage and using the segment's metadata (via the read index) to provide a unified view of the segment to upstream code/users.

With chunking, in Tier-2 storage each segment is made up of a sequence of chunks. Each segment chunk holds a range of bytes from the segment (not necessarily of equal length), with the property that the whole sequence of chunks for a segment covers the entire Tier-2 portion of the segment (that is, not including any non-migrated Tier-1 segment events), with no range overlap. The segment store decides when to create new chunks and keeps metadata as to which segment range maps to which chunk. Chunks are used primarily for retention purposes and to overcome physical limitations with Tier-2 implementations (maximum file size, for example).

In the examples herein, the notation used to denote the group of a segment's chunks is S.Chunks, which is the ordered list of chunks for a segment S. Consider that the segment S is currently in tiered mode and needs to switch to direct mode, and that the last event written to S in tiered mode is event Em (i.e., the mode change was triggered the switch after event Em).

Figure 8:
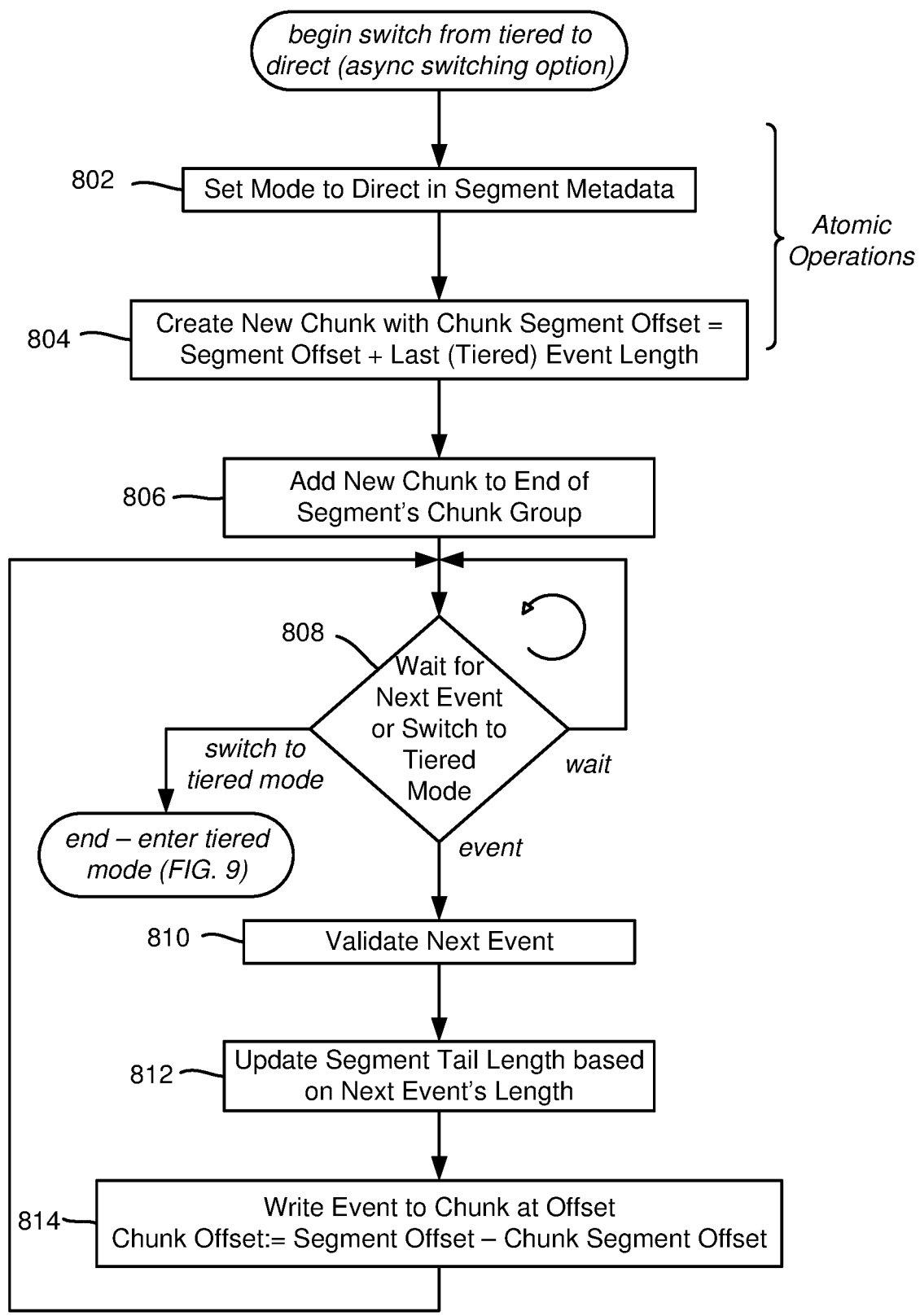
FIG. 8 is a flow diagram showing example operations for changing from the tiered mode to the direct mode when the async switching option is in use, in accordance with various aspects and implementations of the subject disclosure.

As shown via example operation 802 of FIG. 8, in asynch switching, the segment store sets the mode to direct via the metadata property on the segment S, e.g., S.Mode:=Direct. At operation 804, the segment store creates a new chunk Ci with the following property Ci.SegmentOffset:=Em.SegmentOffset+Em.Length, which means that the new chunk Ci is mapped to the offset of the first byte after the last tiered mode event Em. At operation 806 the segment store adds Ci at the end of the ordered list of chunks S.Chunks. Note however that at this point, it is possible that the segment's chunk list S.Chunks does not represent a contiguous range for the segment S, because events up to and including Em (prior to the switch to direct mode) have not yet been written to Tier-2 storage. This is not problematic because the event Em is persisted (cached) to Tier-1 storage, whereby the events up to Em can be read either from Tier-2 storage (if moved there) or from Tier-1 storage (via the cache). As such there is no need for this portion of the segment (up to Em) to be fully in Tier-2 storage before beginning a new chunk, as any Tier-1 events up to Em will eventually get to an existing or newly created prior Tier-2 chunk.

At operation 808, the segment store waits for a next event (or for a switch back to the tiered mode). When the segment store receives a subsequent event En (n>m) for the segment S (which is now in direct mode), the segment store validates the event (operation 810), and updates the segment's tail length (operation 812). Note that with async switching, there is no need to wait for tiered mode events (up to and including the event Em) to be flushed. Operation 814 writes the event to the chunk Ci at offset ChunkOffset:=Em.SegmentOffset-Ci.SegmentOffset. The process continues for further direct mode events, until a switch (if any) to the tiered mode. Note that although not explicitly shown in FIG. 8, it is understood that the segment store creates new chunks as needed and adds them to the ordered list S.Chunks, e.g., when direct mode events reach a chunk size limitation.

Meanwhile (not blocked), the segment store proceeds with writing the tiered mode events up to Em to Tier-1 storage, and then asynchronously writing them to Tier-2 storage. This is no different than existing technology/the classical ingestion pipeline.

Moving these tiered mode events to Tier-2 needs to be done to chunk(s) that are prior to the direct mode chunk Ci. If the outstanding direct mode events up to and including the event Em can fit in one existing chunk, then that existing chunk may be used. However, if new chunk(s) need to be created, those new chunk(s) are placed in the ordered chunk list S.Chunks in the proper order (before the chunk Ci), which ensures that order between events is preserved.

Figure 9:
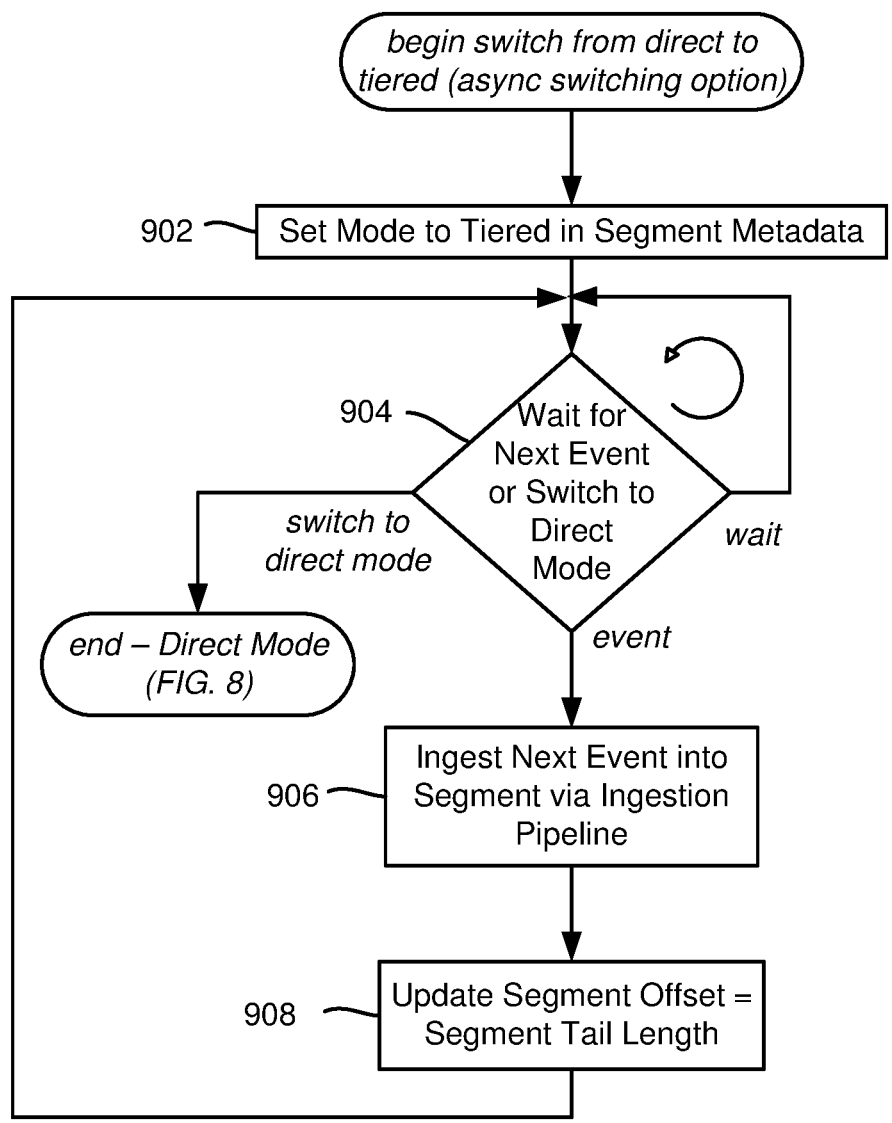
FIG. 9 is a flow diagram showing example operations for changing from the direct mode to the tiered mode when the async switching option is in use, in accordance with various aspects and implementations of the subject disclosure.

Consider that at operation 808 of FIG. 8, the segment S is currently in direct mode and needs to switch to tiered mode, and that the last event written to the segment S in direct mode is event Ex (i.e., the switch was triggered after writing event Ex), and the first event written in tiered mode will be event Ey. When this occurs, as represented in FIG. 9, at operation 902 the segment store changes the segment's mode to tiered, (e.g., S.Mode:=Tiered), and at operation 904 waits for the next event Ey to be received. Operation 906 represents ingesting the next event Ey into the ingestion pipeline, and operation 908 updates the segment offset to the tail length.

Figure 10:
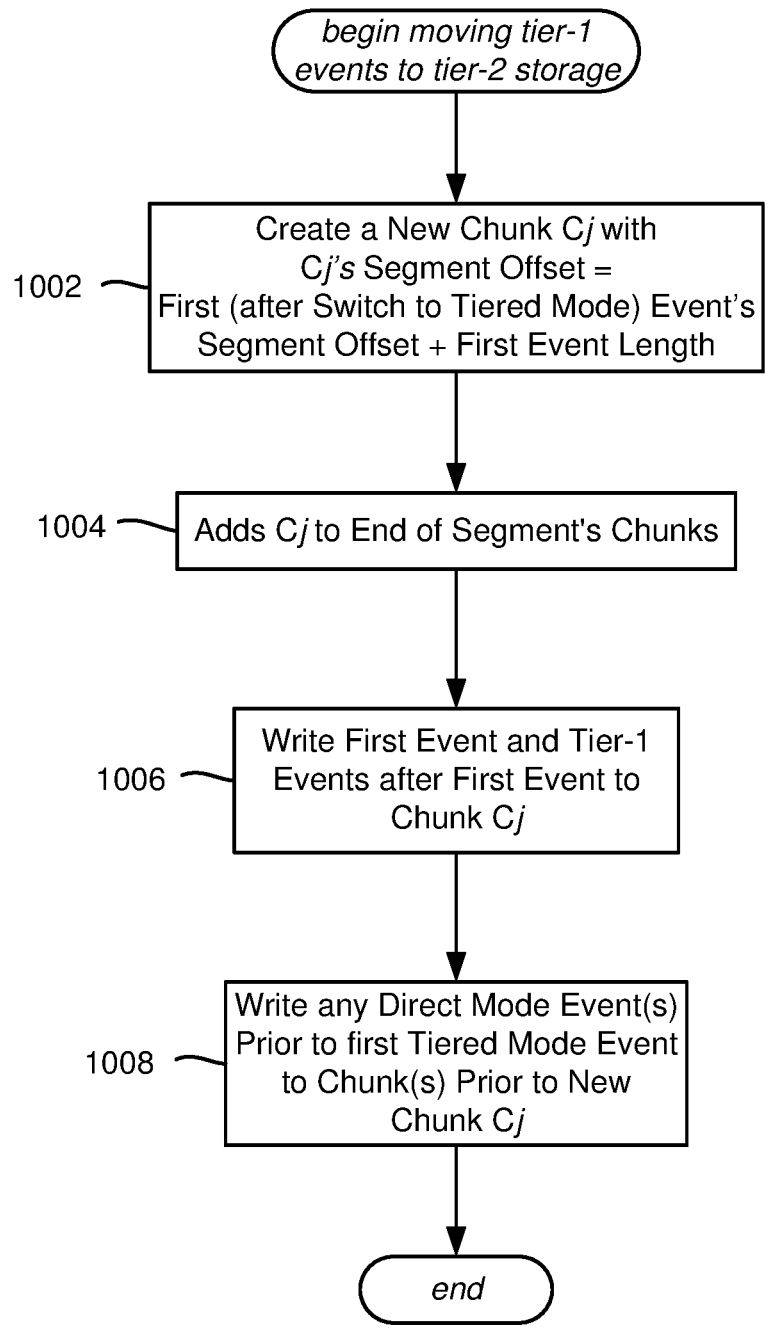
FIG. 10 is a flow diagram showing example operations for handling a segment's chunks with respect to tiered mode events and direct mode events, in accordance with various aspects and implementations of the subject disclosure.

To migrate Tier-1 tiered mode events to Tier-2 storage, as shown in FIG. 10 via operation 1002, the storage writer creates a new chunk Cj with Cj.SegmentOffset:=Em.SegmentOffset+Em.Length. Operation 1004 adds the new chunk Cj to the end of the segment's ordered list of chunks, S.Chunks. The storage writer writes the first tiered mode event Ey and later tiered mode events to chunk Cj at operation 1006; note that any new chunks are created as needed, e.g., when the chunk Cj reaches a size limit.

As represented via operation 1008, any direct mode events up to Em (inclusive) are written to chunk(s), e.g., chunk Ch, before the chunk Cj such that the chunk Ch is prior to Cj. That is, if the segment store needs to create one or more chunks in Tier-2 storage for those earlier direct-mode events, then the segment store ensures that the chunk Cj remains the last chunk for the segment (until a further chunk is needed for later events).

As can be seen, the async switching option has similarities with the flush option, but takes advantage of segment chunking in Tier-2 storage to avoid having to block new events until the segment store's storage writer finishes flushing events to Tier-2 storage.

Figure 11:
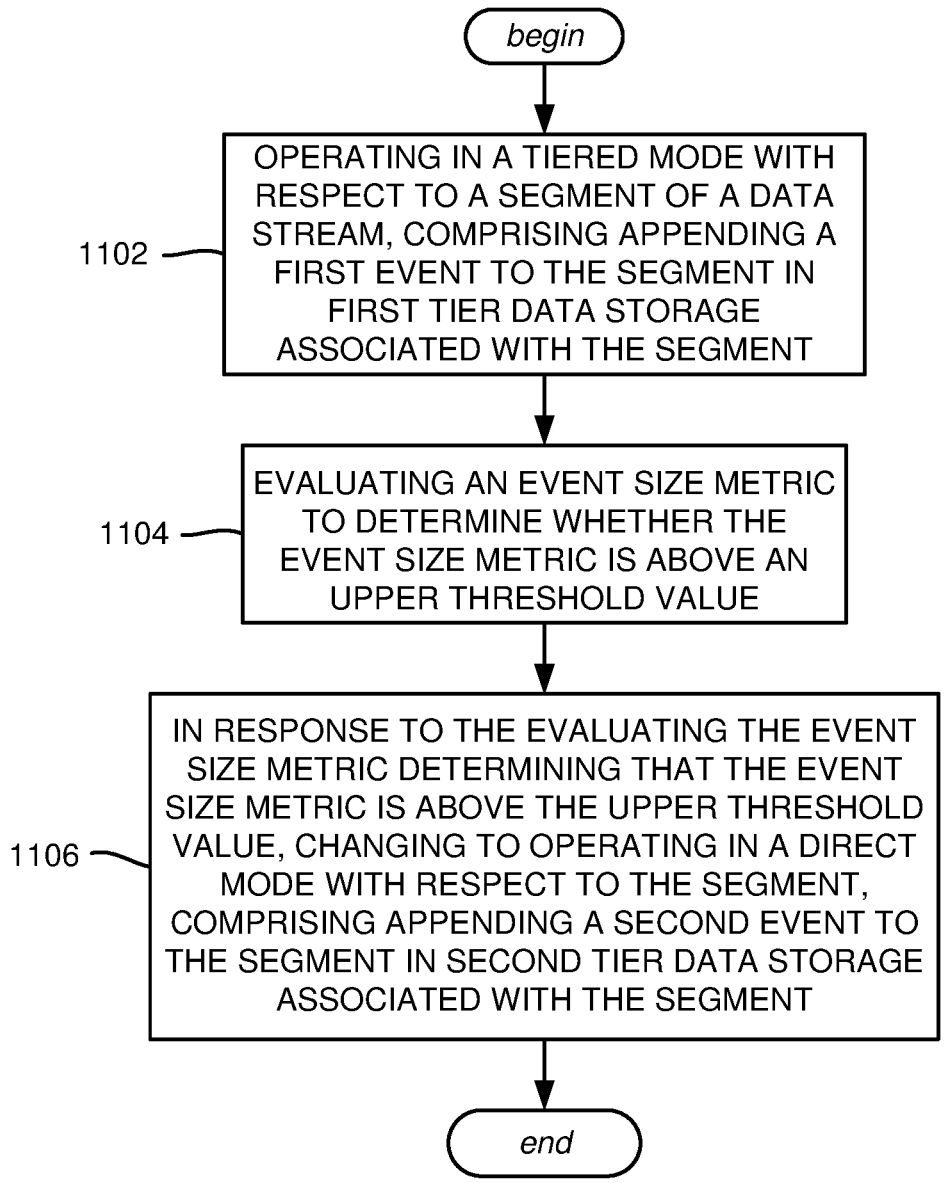
FIG. 11 is a flow diagram showing example operations for changing from the tiered mode to the direct mode, in accordance with various aspects and implementations of the subject disclosure.

One or more aspects can be embodied in a system, such as represented in FIG. 11, and for example can comprise a memory that stores computer executable components and/or operations, and a processor that executes computer executable components and/or operations stored in the memory. Example operations can comprise operation 1102, which represents operating in a tiered mode with respect to a segment of a data stream, comprising appending a first event to the segment in first tier data storage associated with the segment. Operation 1104 represents evaluating an event size metric to determine whether the event size metric is above an upper threshold value. Operation 1106 represents, in response to the evaluating the event size metric determining that the event size metric is above the upper threshold value, changing to operating in a direct mode with respect to the segment, comprising appending a second event to the segment in second tier data storage associated with the segment.

The event size metric can be a first event size metric, and further operations can comprise evaluating a second event size metric to determine whether the event size metric is below a lower threshold value, and in response to the evaluating the second event size metric determining that the event size metric is below the lower threshold value, reverting to the tiered mode with respect to operating the segment, comprising appending a third event to the segment in the first tier data storage.

The upper threshold value and the lower threshold value can be configurable based on user input. The upper threshold value and the lower threshold value can be determined by a threshold value and a sensitivity value.

The event size metric can comprise an average event size value. The event size metric can comprise an average event size value, and further operations can comprise updating the average event size value for each event appended to the segment.

Operating the segment in the direct mode can comprise flushing events in the first tier storage to the second tier data storage. Appending the second event can comprise queueing the second event in a queue until the flushing the events in the first tier data storage to the second tier storage completes, and appending the second event to the second tier data storage from the queue.

Operating the segment in the direct mode can comprise creating a new chunk in the second tier data storage, and appending the second event to the new chunk.

Further operations can comprise writing the first event to an existing chunk in the second tier data storage that is prior in chunk ordering relative to the new chunk.

Figure 12:
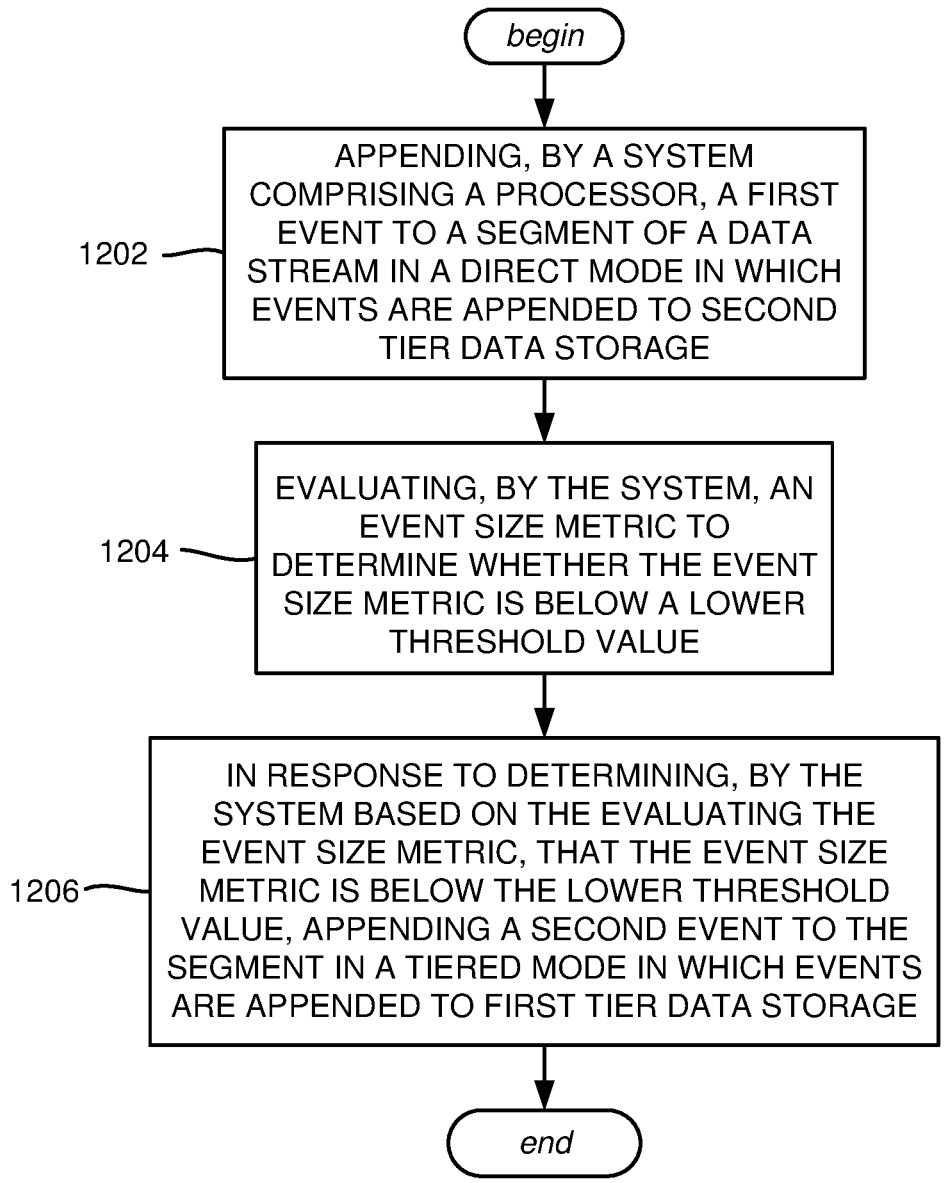
FIG. 12 is a flow diagram showing example operations for changing from the direct mode to the tiered mode, in accordance with various aspects and implementations of the subject disclosure.

One or more example aspects, such as corresponding to example operations of a method, are represented in FIG. 12. Operation 1202 represents appending, by a system comprising a processor, a first event to a segment of a data stream in a direct mode in which events are appended to second tier data storage. Operation 1204 represents evaluating, by the system, an event size metric to determine whether the event size metric is below a lower threshold value. Operation 1206 represents in response to determining, by the system based on the evaluating the event size metric, that the event size metric is below the lower threshold value, appending a second event to the segment in a tiered mode in which events are appended to first tier data storage.

The event size metric can be a first event size metric, and operations can comprise evaluating, by the system, a second event size metric to determine whether the event size metric is above an upper threshold value, and in response to determining, based on the evaluating the second event size metric, that the event size metric is above the upper threshold value, appending a third event to the segment in the tiered mode in which events are appended to the second tier data storage.

Operating the segment in the direct mode can comprise flushing events in the first tier storage to the second tier data storage prior to appending the first event.

Operating the segment in the direct mode can comprise appending the first event to a chunk.

Operations can comprise maintaining, by the system, the event size metric as a running average of event sizes.

Figure 13:
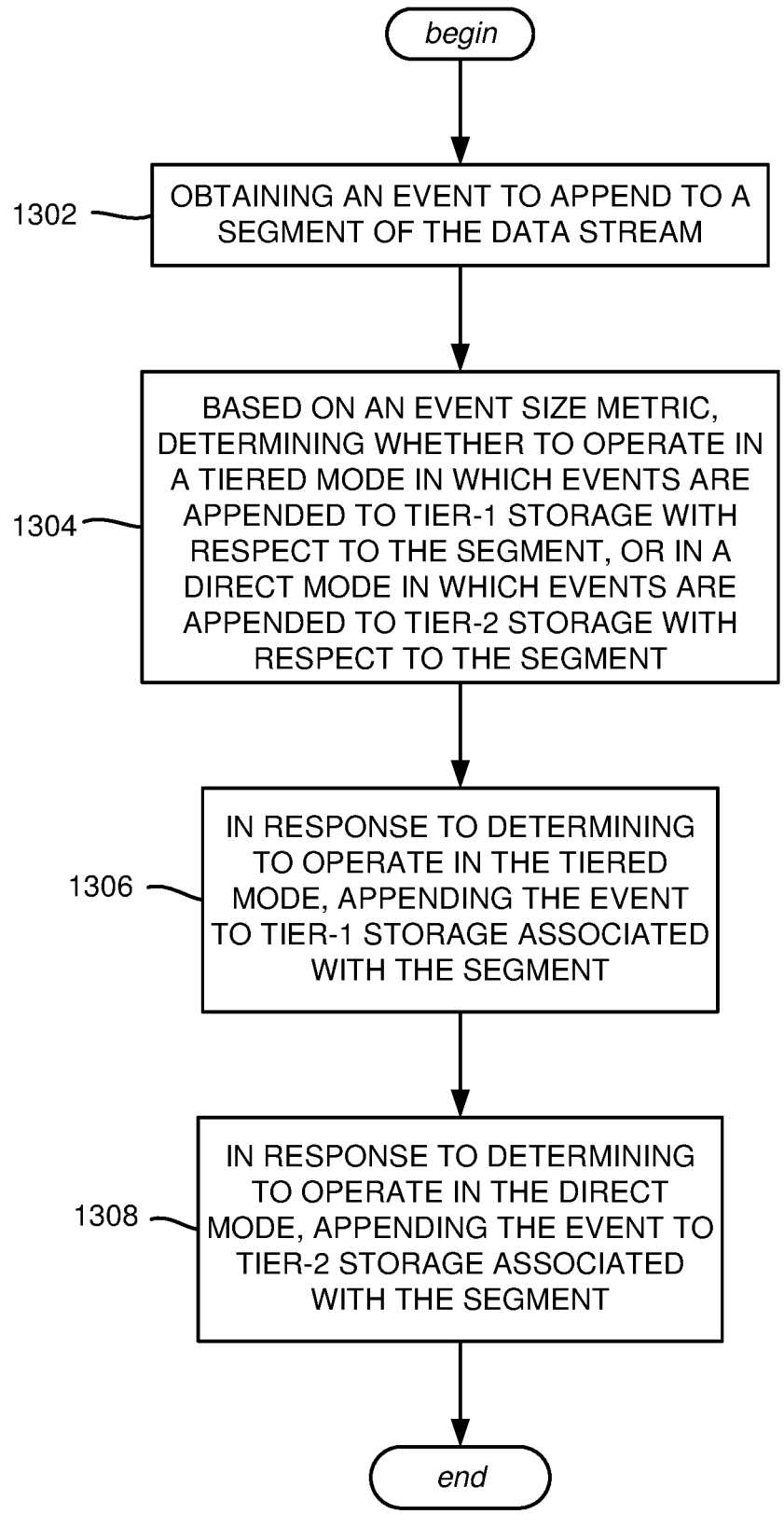
FIG. 13 is a flow diagram showing example operations for determining whether to operate in the tiered mode or the direct mode, in accordance with various aspects and implementations of the subject disclosure.

FIG. 13 summarizes various example operations, e.g., corresponding to a machine-readable storage medium, comprising executable instructions that, when executed by a processor of a streaming data storage system, facilitate performance of operations. Operation 1302 represents obtaining an event to append to a segment of the data stream. Operation 1304 represents, based on an event size metric, determining whether to operate in a tiered mode in which events are appended to tier-1 storage with respect to the segment, or in a direct mode in which events are appended to tier-2 storage with respect to the segment. Operation 1306 represents, in response to determining to operate in the tiered mode, appending the event to tier-1 storage associated with the segment. Operation 1308 represents, in response to determining to operate in the direct mode, appending the event to tier-2 storage associated with the segment.

Further operations can comprise updating the event size metric based on a size of the event.

Determining whether to operate in the direct mode can comprise evaluating whether the event size metric is above an upper threshold value, and determining whether to operate in the tiered mode can comprise evaluating whether the event size metric is below a lower threshold value.

Further operations can comprise changing from operating in the tiered mode to operating in the direct mode, comprising flushing events from tier-1 storage to tier-2 storage.

Further operations can comprise changing from operating in the tiered mode to operating in the direct mode, comprising creating a new chunk in tier-2 storage.

As can be seen, described herein is a technology that facilitates the automatic switching between the classical tiered mode (e.g., one that uses an ingestion pipeline with Tier-1 storage and later moves Tier-1 events to Tier-2 storage), and a direct mode which bypasses classical components to write events more directly to Tier-2 storage. The technology described herein determines when it is appropriate to make the switch to the direct mode new method and back to the tiered mode, and how to transparently and seamlessly switch over to an equivalent implementation of the classical pipeline (and back) without sacrificing durability, ordering and consistency guarantees that are appropriate and highly desirable in a streaming data storage system.

Figure 14:
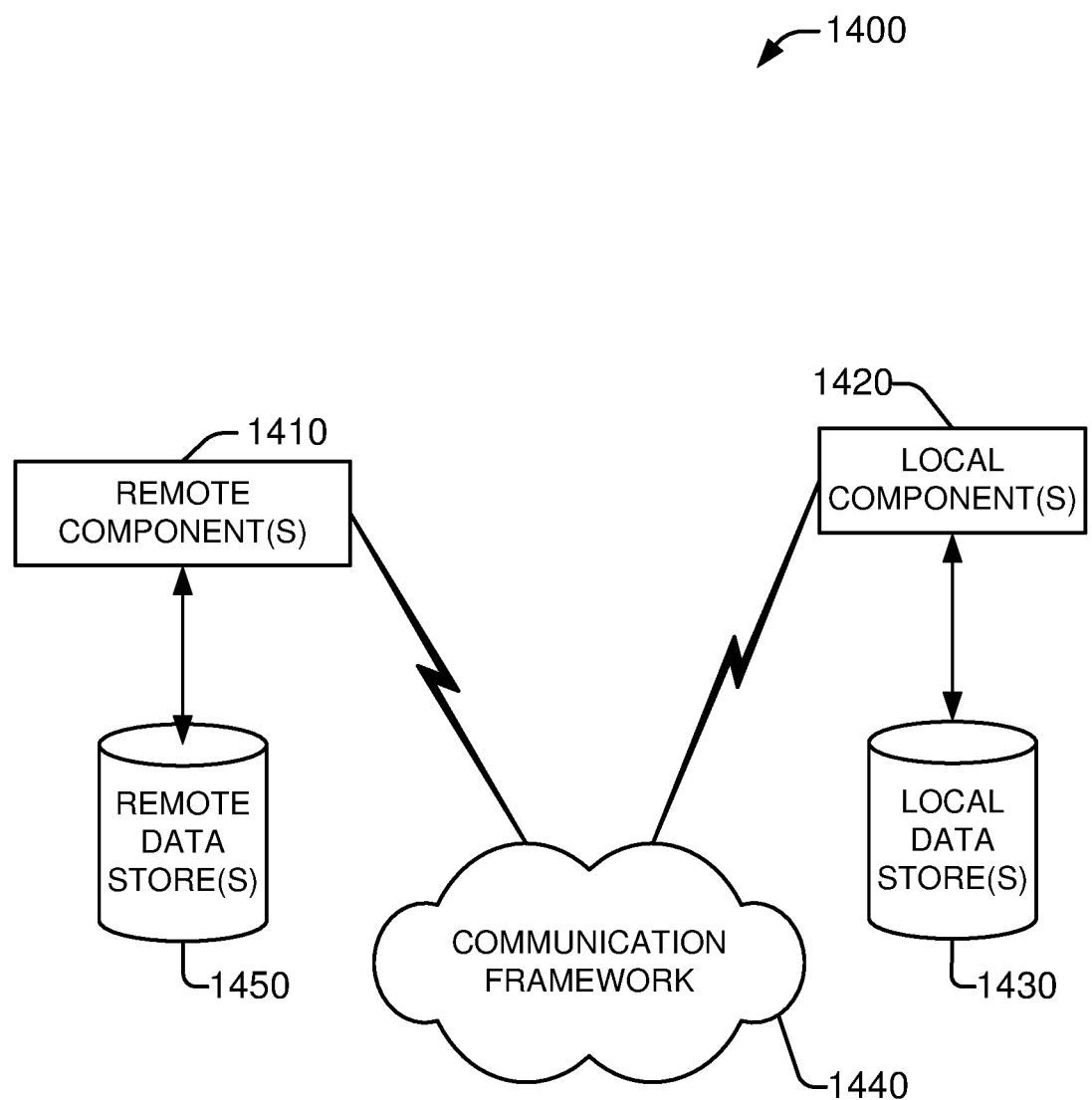
FIG. 14 is a block diagram representing an example computing environment into which aspects of the subject matter described herein may be incorporated.

FIG. 14 is a schematic block diagram of a computing environment 1400 with which the disclosed subject matter can interact. The system 1400 comprises one or more remote component(s) 1410. The remote component(s) 1410 can be hardware and/or software (e.g., threads, processes, computing devices). In some embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The system 1400 also comprises one or more local component(s) 1420. The local component(s) 1420 can be hardware and/or software (e.g., threads, processes, computing devices). In some embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The system 1400 comprises a communication framework 1440 that can be employed to facilitate communications between the remote component(s) 1410 and the local component(s) 1420, and can comprise an air interface, e.g., Uu interface of a UMTS network, via a long-term evolution (LTE) network, etc. Remote component(s) 1410 can be operably connected to one or more remote data store(s) 1450, such as a hard drive, solid state drive, SIM card, device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Figure 15:
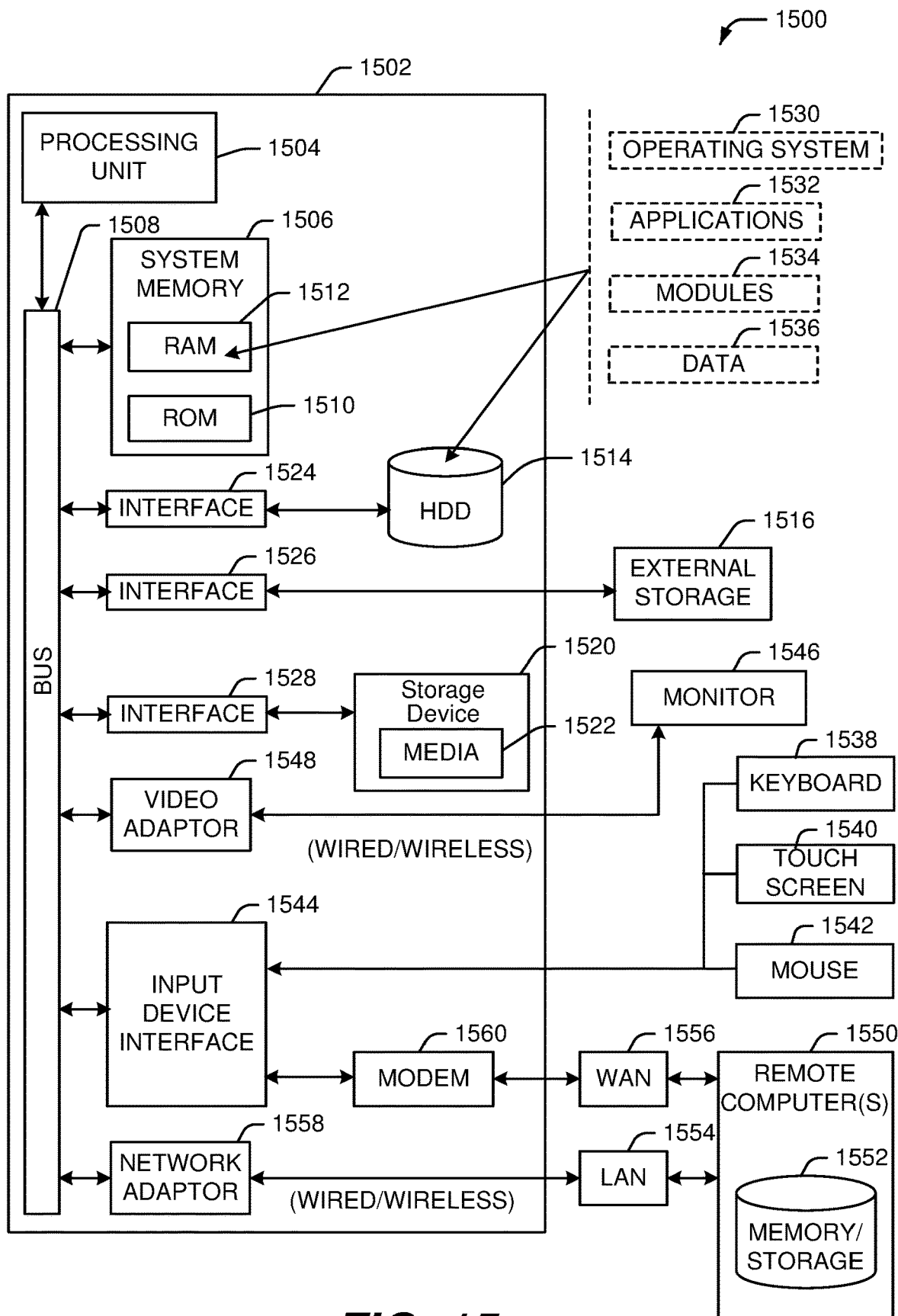
FIG. 15 depicts an example schematic block diagram of a computing environment with which the disclosed subject matter can interact/be implemented at least in part, in accordance with various aspects and implementations of the subject disclosure.

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514.

Other internal or external storage can include at least one other storage device 1520 with storage media 1522 (e.g., a solid state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device(s) 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1494 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
 a processor; and
 a memory that stores executable instructions which, in response to being executed by the processor of the system, facilitate performance of operations, the operations comprising:
  determining whether to switch a current storage mode for a segment of an event stream between a tiered mode and a direct mode, wherein the tiered mode comprises storing received events of the segment in a first tier data storage, concatenating the received events into concatenated data based on a sequential order in which the events were received, and moving the concatenated data to a second tier data storage, wherein the direct mode comprises storing the received events of the segment directly in the second tier data storage based on a sequential order in which the events were received, wherein the first tier data storage comprises a first storage device selected from a first group of storage devices comprising a solid-state drive device and a non-volatile memory express storage device, wherein the second tier data storage comprises a second storage device selected from a second group of storage devices comprising a hard drive device, and wherein the determining comprises:

in response to the current storage mode being the tiered mode:
  determining whether a first average event size of respective sizes of a defined quantity of most recent events of the segment stored in the first tier data storage exceeds a first threshold size, and
  in response to the first average event size exceeding the first threshold size changing the current storage mode to the direct mode for subsequent events of the segment; and
in response to the current storage mode being the direct mode:
  determining whether a second average event size of respective sizes of a defined quantity of most recent events of the segment stored in the second tier data storage is less than a second threshold size, wherein the second threshold size is less than the first threshold size, and
  in response to the second average event size is less than the second threshold size changing the current storage mode to the tiered mode for subsequent events of the segment.

2. The system of claim 1, wherein the changing the current storage mode to the direct mode comprises delaying storage of the subsequent events of the segment to the second tier data storage until after all events of the segment in the first tier data storage have been moved to the second tier data storage.

3. The system of claim 1, wherein the first threshold size and the second threshold size are configurable based on user input.

4. The system of claim 1, wherein the first threshold size and the second threshold size are determined based on a threshold value and a sensitivity value.

5. The system of claim 1, wherein the defined quantity is based on a percentage of events.

6. The system of claim 1, wherein the defined quantity is based on a defined time period.

7. The system of claim 1, wherein the changing the current storage mode to the tiered mode comprises delaying movement of concatenated data of the subsequent events from the first tier data storage to the second tier data storage until after all delayed events of the segment that were being directly being stored to the second tier data storage have been completed.

8. The system of claim 7, wherein the first threshold size and the second threshold size selected based on a performance criterion with respect to storage of the segment of the event stream.

9. The system of claim 1, wherein the concatenated data moved from the first tier data storage is stored in different chunks from events of the segment directly stored in the second tier data storage.

10. The system of claim 9, wherein the chunks containing the events of the segment comprise respective metadata that maintain a sequential order in which the events of the segment were received.

11. A method, comprising:
  determining, by a system comprising a processor, whether to switch a current storage mode for a segment of an event stream between a tiered mode and a direct mode, wherein the tiered mode comprises storing received events of the segment in a first tier data storage, concatenating the received events into concatenated data based on a sequential order in which the events were received, and moving the concatenated data to a second tier data storage, wherein the direct mode comprises storing the received events of the segment directly in the second tier data storage based on a sequential order in which the events were received, wherein the second tier data storage comprises a hard drive device, wherein the first tier data storage comprises a solid-state drive device or a non-volatile memory express storage device, and wherein the determining comprises:
    in response to the current storage mode being the tiered mode:
      determining, by the system, whether a first average event size of respective sizes of a defined quantity of most recent events of the segment stored in the first tier data storage exceeds a first threshold size, and
      in response to the first average event size exceeding the first threshold size changing, by the system, the current storage mode to the direct mode for subsequent events of the segment; and
    in response to the current storage mode being the direct mode:
      determining, by the system, whether a second average event size of respective sizes of a defined quantity of most recent events of the segment stored in the second tier data storage is less than a second threshold size, wherein the second threshold size is less than the first threshold size, and
      in response to the second average event size is less than the second threshold size changing, by the system, the current storage mode to the tiered mode for subsequent events of the segment.

12. The method of claim 11, wherein the changing the current storage mode to the direct mode comprises delaying storage of the subsequent events of the segment to the second tier data storage until after all events of the segment in the first tier data storage have been moved to the second tier data storage.

13. The method of claim 11, wherein the changing the current storage mode to the tiered mode comprises delaying movement of concatenated data of the subsequent events from the first tier data storage to the second tier data storage until after all delayed events of the segment that were being directly being stored to the second tier data storage have been completed.

14. The method of claim 11, wherein the defined quantity is based on a percentage of events.

15. The method of claim 11, wherein the defined quantity is based on a defined time period.

16. A non-transitory machine-readable medium, comprising executable instructions that, in response to being executed by a processor of a streaming data storage system, facilitate performance of operations, the operations comprising:
  determining whether to switch a current storage mode for a segment of an event stream between a tiered mode and a direct mode, wherein the tiered mode comprises storing received events of the segment in a first tier data storage, concatenating the received events into concatenated data based on a sequential order in which the events were received, and moving the concatenated data to a second tier data storage, and wherein the direct mode comprises storing the received events of the segment directly in the second tier data storage based on a sequential order in which the events were received, wherein the first tier data storage comprises a first storage device selected from a first group of storage devices comprising a solid-state drive device or a non-volatile memory express storage device, and wherein the first tier data storage comprises a second storage device selected from a second group of storage devices comprising a hard drive storage device, and wherein the determining comprises:

in response to the current storage mode being the tiered mode:
- determining whether a first average event size of respective sizes of a defined quantity of most recent events of the segment stored in the first tier data storage exceeds a first threshold size, and
- in response to the first average event size exceeding the first threshold size changing the current storage mode to the direct mode for subsequent events of the segment; and in response to the current storage mode being the direct mode:
- determining whether a second average event size of respective sizes of a defined quantity of most recent events of the segment stored in the second tier data storage is less than a second threshold size, wherein the second threshold size is less than the first threshold size, and
- in response to the second average event size is less than the second threshold size changing the current storage mode to the tiered mode for subsequent events of the segment.

17. The non-transitory machine-readable medium of claim 16, wherein the changing the current storage mode to the direct mode comprises delaying storage of the subsequent events of the segment to the second tier data storage until after all events of the segment in the first tier data storage have been moved to the second tier data storage.

18. The non-transitory machine-readable medium of claim 16, wherein the changing the current storage mode to the tiered mode comprises delaying movement of concatenated data of the subsequent events from the first tier data storage to the second tier data storage until after all delayed events of the segment that were being directly being stored to the second tier data storage have been completed.

19. The non-transitory machine-readable medium of claim 16, wherein the concatenated data moved from the first tier data storage is stored in different chunks from events of the segment directly stored in the second tier data storage.

20. The non-transitory machine-readable medium of claim 19, wherein the chunks containing the events of the segment comprise respective metadata that maintain a sequential order in which the events of the segment were received.

* * * * *